United States Patent
Meyer et al.

(10) Patent No.: US 7,713,626 B2
(45) Date of Patent: May 11, 2010

(54) SILANISED SILICAS

(75) Inventors: Jürgen Meyer, Stockstadt (DE); Mario Scholz, Grundau (DE)

(73) Assignee: DeGussa AG (DE)

( * ) Notice: Subject to any disclaimer, the term of this patent is extended or adjusted under 35 U.S.C. 154(b) by 0 days.

(21) Appl. No.: 10/591,609

(22) PCT Filed: Feb. 8, 2005

(86) PCT No.: PCT/EP2005/001229
§ 371 (c)(1),
(2), (4) Date: Sep. 5, 2006

(87) PCT Pub. No.: WO2005/095525
PCT Pub. Date: Oct. 13, 2005

(65) Prior Publication Data
US 2007/0191537 A1    Aug. 16, 2007

(30) Foreign Application Priority Data
Mar. 25, 2004   (DE) .................. 10 2004 010 756

(51) Int. Cl.
*C08L 83/04* (2006.01)
*B32B 27/00* (2006.01)

(52) U.S. Cl. .............. 428/404; 428/405; 524/588

(58) Field of Classification Search .......... 524/588, 524/730; 428/405
See application file for complete search history.

(56) References Cited

U.S. PATENT DOCUMENTS

| | | | |
|---|---|---|---|
| 4,162,243 A * | 7/1979 | Lee et al. ............... 524/847 |
| 5,008,305 A * | 4/1991 | Kennan et al. ........... 523/212 |
| 5,429,873 A * | 7/1995 | Deusser et al. ........... 428/405 |
| 5,623,028 A * | 4/1997 | Fitzgerald et al. ......... 525/474 |
| 5,665,156 A * | 9/1997 | Ettlinger et al. ....... 106/287.14 |
| 5,711,797 A * | 1/1998 | Ettlinger et al. ....... 106/287.14 |
| 5,827,363 A * | 10/1998 | Darsillo et al. ........... 106/484 |
| 5,908,660 A * | 6/1999 | Griffith et al. ............ 427/220 |
| 5,959,005 A * | 9/1999 | Hartmann et al. ........ 523/213 |
| 5,976,480 A * | 11/1999 | Mangold et al. .......... 423/336 |
| 6,051,672 A * | 4/2000 | Burns et al. .............. 528/10 |
| 6,183,867 B1 | 2/2001 | Barthel et al. |
| 6,193,795 B1 * | 2/2001 | Nargiello et al. .......... 106/484 |
| 6,194,508 B1 * | 2/2001 | Achenbach et al. ........ 524/492 |
| 6,197,863 B1 * | 3/2001 | Eck et al. ................. 524/430 |
| 6,323,262 B1 * | 11/2001 | Achenbach et al. ........ 523/343 |
| 6,328,944 B1 * | 12/2001 | Mangold et al. .......... 423/278 |
| 6,649,684 B1 * | 11/2003 | Okel .................... 524/493 |
| 6,846,865 B2 * | 1/2005 | Panz et al. ............... 524/268 |
| 6,887,518 B2 * | 5/2005 | Barthel et al. ............ 427/219 |
| 6,956,080 B2 * | 10/2005 | Scholz et al. ............. 524/493 |
| 2002/0022085 A1 * | 2/2002 | Thise et al. .............. 427/215 |
| 2002/0077412 A1 * | 6/2002 | Kobayashi et al. ........ 524/588 |
| 2003/0100631 A1 * | 5/2003 | Barthel et al. ............ 523/216 |
| 2003/0118499 A1 * | 6/2003 | Scharfe et al. ............ 423/335 |
| 2003/0138715 A1 * | 7/2003 | Barthel et al. ........... 430/108.3 |
| 2004/0077768 A1 * | 4/2004 | Greenwood .............. 524/492 |
| 2004/0120876 A1 * | 6/2004 | Meyer et al. ............. 423/335 |
| 2004/0131527 A1 | 7/2004 | Gottschalk-Gaudig et al. |
| 2004/0220419 A1 * | 11/2004 | Gottschalk-Gaudig et al. ......... 556/10 |
| 2005/0032965 A1 * | 2/2005 | Valero ................... 524/493 |
| 2005/0074386 A1 * | 4/2005 | Valero et al. ............. 423/338 |
| 2006/0017038 A1 * | 1/2006 | Hasenzahl et al. ......... 252/2 |
| 2007/0114831 A1 * | 5/2007 | Bequet ................ 297/452.26 |

FOREIGN PATENT DOCUMENTS

| | | |
|---|---|---|
| EP | 0 382 370 A | 8/1990 |
| EP | 1 199 336 A | 4/2002 |
| WO | WO 01/14480 A | 3/2001 |

* cited by examiner

*Primary Examiner*—Randy Gulakowski
*Assistant Examiner*—Robert Loewe
(74) *Attorney, Agent, or Firm*—Smith, Gambrell & and Russell, LLP

(57) ABSTRACT

Silanized, structurally modified silicas, characterised by vinyl groups or vinyl silyl groups fixed to the surface, hydrophobic groups such as trimethyl silyl and/or dimethyl silyl and/or monomethyl silyl additionally being fixed to the surface, having the following physico-chemical properties: BET surface area $m^2/g$: 25-400 Average primary particle size nm: 5-50 pH: 3-10 Carbon content %: 0.1-10 DBP value %: <200 or not determinable are produced by treating silica with a surface-modifying agent, heat treating and then structurally modifying the mixture obtained. The silica can be used as a filler in silicone rubber.

6 Claims, No Drawings

SILANISED SILICAS

The invention concerns silanised, structurally modified silicas, a process for their production and their use.

The invention provides silanised, structurally modified silicas, characterised by vinyl groups or vinyl silyl groups fixed to the surface, hydrophobic groups such as trimethyl silyl and/or dimethyl silyl and/or monomethyl silyl additionally being fixed to the surface; having the following physicochemical properties:

| | |
|---|---|
| BET surface area m$^2$/g: | 25-400 |
| Average primary particle size nm: | 5-50 |
| pH: | 3-10 |
| Carbon content %: | 0.1-10 |
| DBP value %: | <200 or not determinable |

The invention also provides a process for producing the silanised, structurally modified silica, which is characterised in that silica is treated with a surface-modifying agent, the mixture obtained is heat treated and then structurally modified.

An alternative method is a process for producing silanised, structurally modified silicas according to the invention, which is characterised in that the silicas are sprayed first with water and then with the surface-modifying agent, optionally mixed further, then heat treated and then structurally modified.

The water used can be acidulated with an acid, for example hydrochloric acid, to obtain a pH of 7 to 1. If several surface-modifying agents are used, they can be applied together, but separately, one at a time or as a mixture. The surface-modifying agent(s) can be dissolved in suitable solvents. Once spraying has been completed, mixing can be continued for a further 5 to 30 min.

The mixture is then heat treated at a temperature of 20 to 400° C. for a period of 0.1 to 6 h. The heat treatment can take place under protective gas, such as nitrogen for example.

A further alternative is a process for producing the silanised, structurally modified silica according to the invention, which is characterised in that the silica is treated with the surface-modifying agent in vapour form, the mixture obtained is heat treated and then structurally modified.

The alternative method of surface modification of the silicas can be performed by treating the silicas with the surface-modifying agent in vapour form and then heat treating the mixture at a temperature of 50 to 800° C. for a period of 0.1 to 6 hours. The heat treatment can take place under protective gas, such as nitrogen for example.

The heat treatment can also take place in several stages at different temperatures.

The surface-modifying agent(s) can be applied with one-fluid, two-fluid or ultrasonic nozzles.

The surface modification can be performed in heatable mixers and dryers with sprayers, continuously or in batches. Suitable devices can be ploughshare mixers, plate dryers, fluidised-bed or flash dryers, for example.

The structural modification of the silicas produced in this way can then be performed by mechanical action. The structural modification can possibly be followed by post-grinding. Further conditioning can optionally be performed after the structural modification and/or post-grinding.

The structural modification can be performed with a ball mill or a continuous ball mill, for example.

The post-grinding can be performed with an air-jet mill, toothed disc mill or pinned disc mill, for example.

The conditioning or heat treatment can be performed batchwise, in a drying oven for example, or continuously, in a fluidised bed for example. The conditioning can take place under protective gas, e.g. nitrogen.

A pyrogenically produced silica, preferably a silica produced pyrogenically by flame hydrolysis of an evaporable silicon compound, such as SiCl$_4$ for example, can be used as the silica. Such pyrogenic silicas are known from Ullmanns Enzyklopädie der technischen Chemie, 4$^{th}$ Edition, Volume 21, page 464 (1982).

The following can be used as silicas, for example:

TABLE 1

| | AEROSIL TT 600 | AEROSIL 90 | AEROSIL 130 | AEROSIL 150 | AEROSIL 200 | AEROSIL 300 | AEROSIL 380 | AEROSIL OX50 |
|---|---|---|---|---|---|---|---|---|
| CAS reg. number | | | | 112945-52-5 (old no.: 7631-86-9) | | | | |
| Reaction to water | | | | hydrophilic | | | | |
| Appearance | | | | loose white powder | | | | |
| BET [1] surface area m$^2$/g | 200 ± 50 | 90 ± 15 | 130 ± 25 | 150 ± 15 | 200 ± 25 | 300 ± 30 | 380 ± 30 | 50 ± 15 |
| Average primary particle size mm | 40 | 20 | 16 | 14 | 12 | 7 | 7 | 40 |
| Compacted bulk density [2] normal product g/l | approx. 60 | approx. 80 | approx. 50 | approx. 50 | approx. 50 | approx. 50 | approx. 50 | approx. 130 |
| compacted product g/l (additive "V") | — | — | approx. 120 | approx. 120 | approx. 120 | approx. 120 | approx. 120 | — |
| Loss on drying [3] (2 h at 105° C.) % on leaving the supplier | <2.5 | <1.0 | <1.5 | <0.5 [9] | <1.5 | <1.5 | <2.0 | <1.5 |
| Loss on ignition [4)7] (2 h at 1000° C.) % | <2.5 | <1 | <1 | <1 | <1 | <2 | <2.5 | <1 |
| pH [5] (in 4% aqueous dispersion) | 3.6-4.5 | 3.7-4.7 | 3.7-4.7 | 3.7-4.7 | 3.7-4.7 | 3.7-4.7 | 3.7-4.7 | 3.6-4.3 |
| SiO$_2$ [8] % | >99.8 | >99.8 | >99.8 | >99.8 | >99.8 | >99.8 | >99.8 | >99.8 |
| Al$_2$O$_3$ [8] % | <0.05 | <0.05 | <0.05 | <0.05 | <0.05 | <0.05 | <0.05 | <0.08 |
| Fe$_2$O$_3$ [8] % | <0.003 | <0.003 | <0.003 | <0.003 | <0.003 | <0.003 | <0.003 | <0.01 |
| TiO$_2$ [8] % | <0.03 | <0.03 | <0.03 | <0.03 | <0.03 | <0.03 | <0.03 | <0.03 |

TABLE 1-continued

|  | AEROSIL TT 600 | AEROSIL 90 | AEROSIL 130 | AEROSIL 150 | AEROSIL 200 | AEROSIL 300 | AEROSIL 380 | AEROSIL OX50 |
|---|---|---|---|---|---|---|---|---|
| HCl [8) 10)] % | <0.025 | <0.025 | <0.025 | <0.025 | <0.025 | <0.025 | <0.025 | <0.025 |
| Screen oversize [6)] (according to Mocker, 45 μm) % | <0.05 | <0.05 | <0.05 | <0.05 | <0.05 | <0.05 | <0.05 | 0.2 |

[1)] by reference to DIN 66131
[2)] by reference to DIN ISO 787/XI, JIS K 5101/18 (not screened)
[3)] by reference to DIN ISO 787/II, ASTM D 280, JIS K 5101/21
[4)] by reference to DIN 55921, ASTM D 1208, JIS K 5101/23
[5)] by reference to DIN ISO 787/IX, ASTM D 1208, JIS K 5101/24
[6)] by reference to DIN ISO 787/XVIII, JIS K 5101/20
[7)] based on the substance dried for 2 hours at 105° C.
[8)] based on the substance annealed for 2 hours at 1000° C.
[9)] special moisture-excluding packaging
[10)] HCl content in ignition loss component All compounds that are suitable for fixing vinyl or vinyl silyl and trimethyl silyl and/or dimethyl silyl and/or monomethyl silyl groups to the silica surface can be used as surface-modifying agents. In particular, the vinyl silyl and methyl silyl groups can be applied to the silica by means of one compound, such as e.g. 1,3-divinyl-1,1,3,3-tetramethyl disilazane or dimethyl vinyl silanol, or by means of multiple compounds, such as e.g. vinyl triethoxysilane and hexamethyl disilazane or trimethyl silanol.

The silanised, structurally modified silica according to the invention can be used as a filler in silicone rubber.

If this low-structured, pyrogenic silicon dioxide is incorporated into silicone rubber, entirely novel properties are obtained in the silicone rubber.

The structural modification changes the morphology of the pyrogenic silicon dioxide such that a lower degree of intergrowth and hence a lower structure are obtained.

The silicone rubber can be a liquid silicone rubber (LSR).

Polydimethyl siloxanes having molecular weights of between 400,000 and 600,000, which are produced by addition of regulators such as hexamethyl or divinyl tetramethyl disiloxane and carry corresponding end groups, are used for elastomer applications. In order to improve the vulcanisation behaviour and also the tear propagation resistance, small amounts (<1%) of vinyl groups are often incorporated into the main chain as substituents by adding vinyl methyl dichlorosilane to the reaction mixture (VMQ).

The molecular structure of liquid silicone rubber (LSR) is almost identical to that of HTV, except that the average molecular chain length is shorter by a factor of 6 and hence the viscosity is lower by a factor of 1000 (20-40 Pas). The processor is supplied with two components (A and B) in equal quantities, which already contain the fillers, vulcanising agents and optionally other additives.

There are two types of filler: reinforcing and non-reinforcing fillers.

Non-reinforcing fillers are characterised by extremely weak interactions with the silicone polymer. They include chalk, silica flour, diatomaceous earth, mica, kaolin, $Al(OH)_3$ and $Fe_2O_3$. The particle diameter is of the order of 0.1 μm. They are used to raise the viscosity of the compounds in the unvulcanised state and to increase the Shore hardness and the modulus of elasticity of the vulcanised rubbers. Improvements in tear strength can also be achieved in the case of surface-treated fillers.

Reinforcing fillers are primarily fine-particle silicas having a surface area of >125 $m^2/g$. The reinforcing effect can be attributed to the bond between the filler and the silicone polymer. Such bonds are formed between the silanol groups at the surface of the silicas (3-4.5 SiOH groups/$nm^2$) and the silanol groups in the a-ω-dihydroxypolydimethyl siloxanes by means of hydrogen bridge bonds to the oxygen in the siloxane chain. These filler-polymer interactions result in increased viscosity and changes to the glass transition temperature and the crystallisation behaviour. On the other hand, polymer-filler bonds improve the mechanical properties but can also lead to premature stiffening (crepe hardening) of the rubbers.

Talc occupies an intermediate position between reinforcing and non-reinforcing fillers. Fillers are also used for special effects. They include iron oxide, titanium dioxide, zirconium oxide or barium zirconate to increase thermal stability.

Silicone rubbers can also contain catalysts, crosslinking agents, coloured pigments, anti-sticking agents, plasticisers and coupling agents as additional components.

Plasticisers are needed in particular to establish a low modulus of elasticity. Internal coupling agents are based on functional silanes, which can interact firstly with the substrate and secondly with the crosslinking silicone polymer (used primarily in RTV-1 rubbers).

Low-molecular-weight or monomeric silanol-rich compounds (e.g. diphenyl silanediol, $H_2O$) counteract premature stiffening. They forestall too strong an interaction of the silicone polymers with the silanol groups in the filler by reacting more quickly with the filler. A corresponding effect can also be achieved by partially coating the filler with trimethyl silyl groups (filler treatment with methyl silanes).

The siloxane polymer can also be chemically modified (phenyl polymers, boron-containing polymers) or blended with organic polymers (butadiene-styrene copolymers).

The low viscosity of the starting polymer requires particularly intensive incorporation and kneading in specially developed mixing units in order to achieve a homogeneous distribution. To facilitate filler absorption and to prevent crepe hardening, the silica is rendered fully hydrophobic-usually in situ during the mixing process using hexamethyl disilazane (HMDS).

The vulcanisation of LSR blends is performed by hydrosilylation, i.e. by addition of methyl hydrogen siloxanes (having at least 3 SiH groups in the molecule) to the vinyl group in the polymer with catalysis by ppm amounts of Pt(O) complexes, the crosslinking agent and catalyst being contained in the separate components on delivery. Special inhibitors, for example 1-ethynyl-1-cyclohexanol, prevent premature vulcanisation on mixing of the components and establish a dropping time of approximately 3 days at room temperature. The proportions can be adjusted within a considerable bandwidth by means of the platinum and inhibitor concentration.

LSR blends are increasingly being used to produce electrically conductive silicone rubber products, because the addition crosslinking is not disrupted by furnace blacks as is the case with the peroxide vulcanisation conventionally used with HTV (acetylene black is preferably used in HTV blends). Conductive furnace blacks are also easier to incorporate and to distribute than graphite or metal powders, of which silver is preferred.

The silicone rubber with the silicas according to the invention displays the following advantages:

Experiments in LSR (liquid silicone rubber) show that the structurally modified hydrophobic oxides in accordance with Examples 1 to 3 according to the invention lead to markedly lower viscosities in the liquid silicone in comparison to the hydrophobic educt (pyrogenic silica).

LSRs produced with the silicas according to the invention display no yield points, which is particularly advantageous because very good flow characteristics are desirable when processing liquid silicone rubber.

Furthermore, Example 3 also displays the advantage that a markedly higher tear propagation resistance can be achieved with the structurally modified, vinyl silane-treated silicas.

With the structurally modified oxides, materials can be used according to the invention which because of their low structure already display extremely low viscosities and no yield points and which therefore do not have to be exposed to high shear forces during production. The saving of energy, time and material costs, combined with the production of vulcanisates having superior mechanical properties, is advantageous to the user.

EXAMPLES

Pyrogenic silica is placed in a mixer and sprayed first with water and then with the surface-modifying agent or the blend of surface-modifying agents. The reaction mixture then undergoes a single-stage or multi-stage heat treatment. The conditioned material is structurally modified with a ball mill, followed if necessary by post-grinding with a toothed disc mill. The structurally modified or structurally modified and post-ground material undergoes a further heat treatment if necessary.

TABLE 2

Overview of the production of the silicas according to the invention (examples)

| Name | Silica used | Amount of water (parts/100 parts of silica) | SM*) (parts/100 parts of silica) | Heat treatment, stage 1 temp.[° C.]/ duration [h] | Heat treatment, stage 2 temp.[° C.]/ duration [h] | Post-grinding**) | Heat treatment***) temp.[° C.]/ duration [h] |
|---|---|---|---|---|---|---|---|
| Sil 1 | AEROSIL ® 200 | 5 | A/5 D/5 | 140/2 | — | no | no |
| Sil 2 | AEROSIL ® 300 | 5 | B/15 C/1.8 | 20/2 | 140/2 | yes | yes |
| Sil 3 | AEROSIL ® 300 | 5 | A/8.5 B/20 | 50/5 | 140/1 | yes | 120/2 |
| Sil 4 | AEROSIL ® 300 | 5 | A/16 B/12 | 20/6 | 120/5 | yes | 120/3 |
| Sil 5 | AEROSIL ® 150 | 5 | C/20 | 130/2 | — | yes | 120/2 |
| Sil 6 | AEROSIL ® 130 | 2 | C/5 D/5 | 150/3 | — | no | no |
| Sil 7 | AEROSIL ® 300 | 5 | A/8.5 B/20 | 50/5 | 140/1 | no | no |
| Sil 8 | AEROSIL ® 200 | 5 | B/10 C/5 | 20/20 | 140/3 | yes | no |
| Sil 9 | AEROSIL ® 300 | 5 | C/16 | 20/2 | 140/2 | yes | no |
| Sil 10 | AEROSIL ® 200 | 2 | A/10 B/5 | 20/2 | 140/24 | yes | 120/2 |
| Sil 11 | AEROSIL ® 300 | 5 | A/8.5 B/20 | 50/5 | 140/1 | yes | no |

*)SM = Surface-modifying agent:
A = vinyl triethoxysilane
B = hexamethyl disilazane
C = 1,3-divinyl-1,1,3,3-tetramethyl disilazane
D = methyl trimethoxysilane
With more than one SM, blends were used.
**)Post-grinding = grinding after structural modification
***)Heat treatment = heat treatment after post-grinding Production of the Comparative Silica 2 kg of AEROSIL® are placed in a mixer and sprayed first with 0.1 kg of water and then with a mixture of 0.4 kg of hexamethyl disilazane and 0.17 kg of vinyl triethoxysilane, whilst being mixed. When spraying has been completed, mixing is continued for a further 15 minutes and the reaction mixture is conditioned first for 5 hours at 50° C. and then for 1 hour at 140° C.

TABLE 3

Physico-chemical data for the silicas according to the invention (examples) and the comparative silica

| Name | Compacted bulk density [g/l] | Loss on drying [%] | Loss on ignition [%] | pH | C content [%] | DBP adsorption [%] | Specific BET surface area [m²/g] |
|---|---|---|---|---|---|---|---|
| Comparative silica | 48 | 0.9 | 4.1 | 9.0 | 4.0 | n.d. | 197 |
| Sil 1 | 236 | 1.2 | 1.6 | 4.4 | 1.1 | 9.7 | 136 |
| Sil 2 | 147 | 0.7 | 3.8 | 6.2 | 3.8 | n.d. | 201 |
| Sil 3 | 120 | 0.4 | 3.6 | 7.5 | 4.0 | n.d. | 191 |
| Sil 4 | 132 | 0.5 | 3.0 | 5.2 | 3.5 | 128 | 189 |
| Sil 5 | 138 | 0.2 | 2.8 | 5.5 | 2.8 | n.d. | 103 |
| Sil 6 | 249 | 0.8 | 1.1 | 6.3 | 1.5 | 91 | 79 |
| Sil 7 | 266 | 1.1 | 3.4 | 8.5 | 4.0 | 121 | 204 |
| Sil 8 | 161 | 0.9 | 2.7 | 6.1 | 4.3 | 91 | 117 |
| Sil 9 | 132 | 1.0 | 4.0 | 6.7 | 4.9 | n.d. | 205 |
| Sil 10 | 149 | 0.6 | 2.8 | 5.1 | 2.8 | n.d. | 155 |
| Sil 11 | 163 | 0.8 | 3.5 | 8.5 | 4.0 | n.d. | 197 |

Testing of the Structurally Modified Pyrogenic Silicas in Silicone Rubber

The products from Table 2 are tested in an LSR silicone formulation. The hydrophobic educts that were used for the structural modification are used as comparative material.

LSR Silicone Rubber

20% silica is incorporated into organopolysiloxane (Silopren U 10 GE Bayer) in a high-speed planetary mixer at low speed (50/500 rpm planetary mixer/high-speed mixer).

As soon as the silica is completely wetted, a vacuum of approx. 200 mbar is applied and the mixture is dispersed for 30 minutes at a speed of 100 rpm (planetary mixer) and 2000 rpm (high-speed mixer) (cooled with tap water). After cooling, the basic mixture can be crosslinked.

340 g of the basic mixture are weighed into a stainless steel beaker. 6.00 g inhibitor (2% pure ECH in silicone polymer U 1) and 0.67 g platinum catalyst solution and 4.19 g Silopren U 730 are weighed one at a time into the mixture and homogenised at a speed of n=500 rpm and degassed.

Vulcanisation of the Formulations

4×50 g or 2×100 g of the mixture are needed to vulcanise the 2 mm vulcanisates. The sheets are then pressed in a press for 10 minutes under a pressure of 100 bar and at a temperature of 120° C. 120 g of the mixture are needed to vulcanise the 6 mm vulcanisates. The sheets are pressed in a press for 12 minutes under a pressure of 100 bar and at a temperature of 120° C. The vulcanisates are then post-vulcanised in an oven for 4 hours at 200° C.

The formulations with structurally modified products (Examples 3, 7, 11) display markedly lower rheological properties (Table 4) in comparison to the comparative silica (not structurally modified). The viscosity is up to 60% lower than the original value for the educt.

TABLE 4

Rheological properties with 20% silica

| Silica | Yield point [Pa] | Viscosity [Pas] D = 10 s⁻¹ |
|---|---|---|
| Example 7 | 0 | 54 |
| Example 11 | 0 | 55 |
| Example 3 | 0 | 51 |
| Comparative silica | 0 | 153 |

TABLE 5

Mechanical properties with 20% silica

| Silica | Tensile strength [N/mm²] | Elongation at break [%] | Tear propagation resistance [N/mm] | Hardness [Shore A] |
|---|---|---|---|---|
| Example 7 | 4.0 | 300 | 3.2 | 41 |
| Example 11 | 4.1 | 290 | 3.4 | 41 |
| Example 3 | 5.5 | 350 | 23.7 | 41 |
| Comparative silica | 5.0 | 300 | 4.0 | 45 |

It can be seen from Example 3 in Table 5 that through the structural modification of the vinyl-modified pyrogenic oxide, with subsequent post-grinding and conditioning, a very high tear propagation resistance can be obtained in the silicone vulcanisate, the rheological properties of the compounds being at a very low level.

The invention claimed is:

1. The process for producing the silanised, structurally modified silicas, comprising a) treating pyrogenically produced silicas with a surface-modifying agent(s) in either vapor or spray form, wherein the modifying agent(s) is suitable for fixing vinyl groups or vinyl silyl groups and hydrophobic groups selected from dimethyl silyl, dimethyl silyl, monomethyl silyl or mixtures thereof to the surface of the silica, b) heat treating the surface agent-modified silica, c)

structurally modifying the heat treated surface agent modified silica by mechanical action to form low structured, surface agent-modified pyrogenic silica, d) post-grinding and heat treating the structurally modified silica and e) recovering the ground, heat treated, silanized, structurally modified pyrogenic silica, having surfaces fixed thereto vinyl groups or vinyl silyl groups, and hydrophobic groups selected from trimethyl silyl, dimethyl silyl, monomethyl silyl or mixtures thereof.

2. Silanised, structurally modified pyrogenically produced silicas, produced according to claim 1, characterized by surfaces having fixed thereto vinyl groups or vinyl silyl groups, hydrophobic groups selected from trimethyl silyl, dimethyl silyl, monomethyl silyl or mixtures thereof, and by the following physico-chemical properties:

| | |
|---|---|
| BET surface area m$^2$/g: | between 103-400 |
| Average primary Particle size nm: | 5-50 |
| pH: | 3-10 |
| C content %: | between 0.1-10 |
| DBP value %: | <200 or not determinable. |

3. A silicone rubber containing as a filler the silanized, structurally modified silica according to claim 2.

4. The process for producing the silanised, structurally modified silicas according to claim 1, wherein the silica treating step includes spraying the silicas first with water and then with the surface-modifying agent.

5. The process according to claim 4, further comprising, prior to heat treatment step b), further mixing the treated silica mixture.

6. The process for producing the silanised, structurally modified silica according to claim 1, wherein the silica treating step includes treating the silica with the surface modifying agent in vapor form.

* * * * *